United States Patent [19]

Nikly

[11] 4,112,907
[45] Sep. 12, 1978

[54] METHOD AND DEVICE FOR ENSURING THE TIGHTNESS OF A CYLINDERHEAD ON THE CYLINDER BLOCK OF A THERMAL ENGINE, IN PARTICULAR, A DIESEL ENGINE

[75] Inventor: Jean Nikly, Caluire, France

[73] Assignee: Automobiles M. Berliet, Lyons, France

[21] Appl. No.: 592,783

[22] Filed: Jul. 2, 1975

[51] Int. Cl.² ............................................. F02F 1/10
[52] U.S. Cl. ............................ 123/193 CH; 123/41.84
[58] Field of Search ........................ 123/41.81–41.84, 123/193 CH; 277/168–172, 213, 215, 235 B

[56] References Cited
U.S. PATENT DOCUMENTS

| | | | |
|---|---|---|---|
| 2,679,241 | 5/1954 | Dickson | 123/193 CH |
| 3,340,774 | 9/1967 | Brenneke | 123/41.81 X |
| 3,653,369 | 4/1972 | Fangman et al. | 123/193 CH |

*Primary Examiner*—Charles J. Myhre
*Assistant Examiner*—Craig R. Feinberg
*Attorney, Agent, or Firm*—Irving M. Weiner

[57] ABSTRACT

A cylinderhead assembly system for ensuring fluid-tightness of assembly of a cylinderhead and the cylinder block of a thermal piston engine, and particularly a diesel engine. A plurality of screws are disposed around the cylinder liner and are oriented substantially parallel to the longitudinal axis of the liner. The stem of each screw passes between two raised support portions, e.g., the upper part of each cylinder liner, and a boss, with each screw being mounted as a compensator between the two raised support portions to balance stresses at the time of the tightening operation.

1 Claim, 19 Drawing Figures

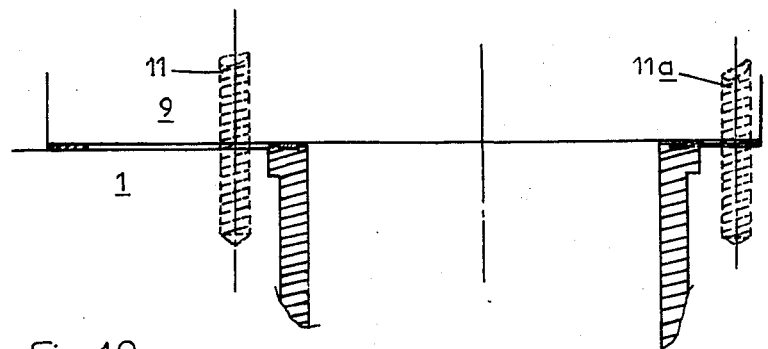
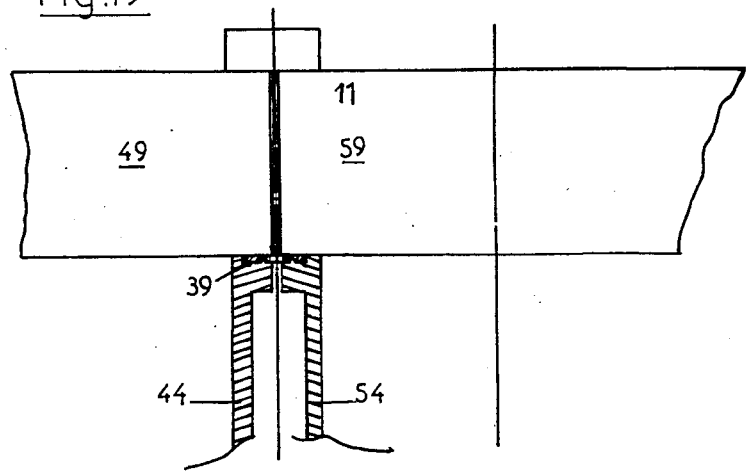
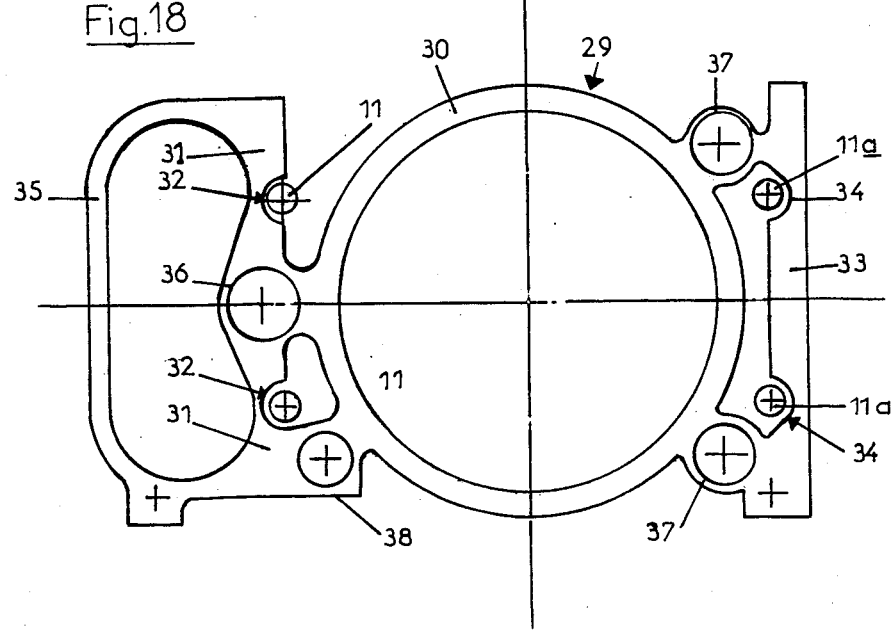

METHOD AND DEVICE FOR ENSURING THE TIGHTNESS OF A CYLINDERHEAD ON THE CYLINDER BLOCK OF A THERMAL ENGINE, IN PARTICULAR, A DIESEL ENGINE

The present invention relates to a device and a method of securing together a cylinder block and a cylinderhead. In particular, the invention relates to a method and a device of a new type for ensuring the fluid-tightness of the assembly of a cylinderhead and the cylinder block of a thermal piston engine. It relates especially to a diesel engine, but it should be understood that the invention may be used in an internal combustion engine too, or in a free piston engine.

BACKGROUND OF THE INVENTION

It is known that in engines having removable wet cylinder liners, the upper part of the body of the liner ends in a flange, generally topped by a slightly raised rib. The level of the upper part of said rib or said flange defines a slight oversize with respect to the level of the top part of the block into which the liner is nested. The assembly is then covered by a flat gasket which is topped by a cylinderhead. The cylinderhead is tightened by means of screws, each of which has a stem passing through the cylinderhead, the cylinderhead gasket, and a hole tapped in the cylinder block for the fixing or fastening thereof. Several set screws are thus distributed around each cylinder of the engine. In order to make the explanations clearer, this known disposition is illustrated in the FIGS. 1 to 5 appended hereto.

FIG. 1 shows a cylinder block 1 the flat upper part 2 of which includes a number of housings 3. In each of said housings a liner 4 is inserted, the top of which 35 defines a flange 5. Said flange is topped, for instance, by two raised ribs 6 and 7. Said ribs are concentric, being centered on the axis of the liner 4.

After the liners are mounted in the cylinder block 1, it will be seen that the ribs 6 and 7 project slightly above the plane of the part 2.

As is known, a flat gasket 8 is then disposed over said top 2, and then the assembly is topped by a cylinderhead which can be either an individual cylinderhead 9, or a cylinderhead 10 for several cylinders (FIG. 1).

The tightening is made by means of screws such as the screw 11. Owing to the raised positions of the ribs 6 and 7, it will be seen from FIG. 5 that tightening each of the screws 11 tends to bring about the following deformations:
 a rocking of the flange 5 with respect to the bearing thereof on the cylinder block 1, that is, a swelling of the body of the liner 4, as indicated by the arrow 12;
 a depression in the bearing top part 2 in the area 13 in close vicinity to the flange 5; and
 a deformation of the bearing surface of the cylinderhead 9 in the area 14.

These deformations bring about various drawbacks, the worst of which is the swelling 12 of the liner 4, all the more so as said swelling is not uniform all around the axis of the bore.

One object of the present invention is to obviate said drawbacks by providing an arrangement which, while ensuring a correct fluid-tightness for the liner 4 at the level of the ribs 6, 7, allows to removal any secondary deformation and maintains the accurately cylinderical shape of the inner surface of said liner 4.

SUMMARY OF THE INVENTION

The present invention provides a method of securing together a cylinder block and a cylinderhead of an engine with an interposed gasket which bears on the raised top of at least one liner disposed in the cylinder block. The method comprises the steps of disposing a plurality of screws around the liner and orienting the screws substantially parallel to the longitudinal axis of the liner. The method also includes the step of passing the stem of each of the screws through the cylinderhead and gasket and into the cylinder block intermediate two support portions of substantially the same thickness which are disposed between the top major surface of the cylinder block and the bottom major surface of the cylinderhead. The method also includes the steps of mounting and tightening each of the screws intermediate the support portions for balancing stresses produced by the tightening of the screws.

The present invention also provides a method for ensuring the fluid-tightness of a cylinderhead on the top part of a cylinder block by tightening a cylinderhead gasket which bears on the raised top of at least one cylinderical liner, wherein set screws are used, which are oriented parallel to the axis of the cylinderical liner, and disposed around the latter, the stem of each screw passing between two raised bearings of substantially the same thickness which are housed between the two opposite planes on the bottom of the cylinderhead and on the top part of the cylinder block, one of said bearings consisting of the raised portion of the top of the liner. In other words, each screw is mounted as a compensator between the two bearings, whereby the stresses are balanced at the time of the tightening operation.

A device according to the invention, for carrying out the above method, is characterized in that it includes on one side of each set screw for the cylinderhead at least a first raised bearing located between the opposite planes of the cylinderhead and the cylinder block, the thickness of said first bearing being substantially equal to that of a second raised bearing located on the other side of the screw stem and consisting of the raised portion of the top of the corresponding cylindrical liner.

Of course, the first bearing may be provided according to several modified embodiments. To this end, a raised portion may be provided on the cylinderhead gasket, or a raised portion on the bearing top of the cylinder block, or again a raised portion beneath the tightening surface of the cylinderhead. It is also possible to recess the cylinderhead gasket around the stem of the screw, or replace the conventional single gasket by several elements or strips which define individual bearings at the suitable locations.

BRIEF DESCRIPTION OF THE DRAWINGS

FIG. 17 is a sectional view showing the assembling of the cylinderhead and the cylinder block using the gasket shown in FIG. 16.

FIG. 18 is a plane view of a cylindrical gasket according to an eighth embodiment, to be used with an individual cylinderhead in a multicylinder diesel engine.

FIG. 19 shows two adjacent individual cylinderheads, provided each with a gasket according to FIG. 18.

DETAILED DESCRIPTION

Figure 1:
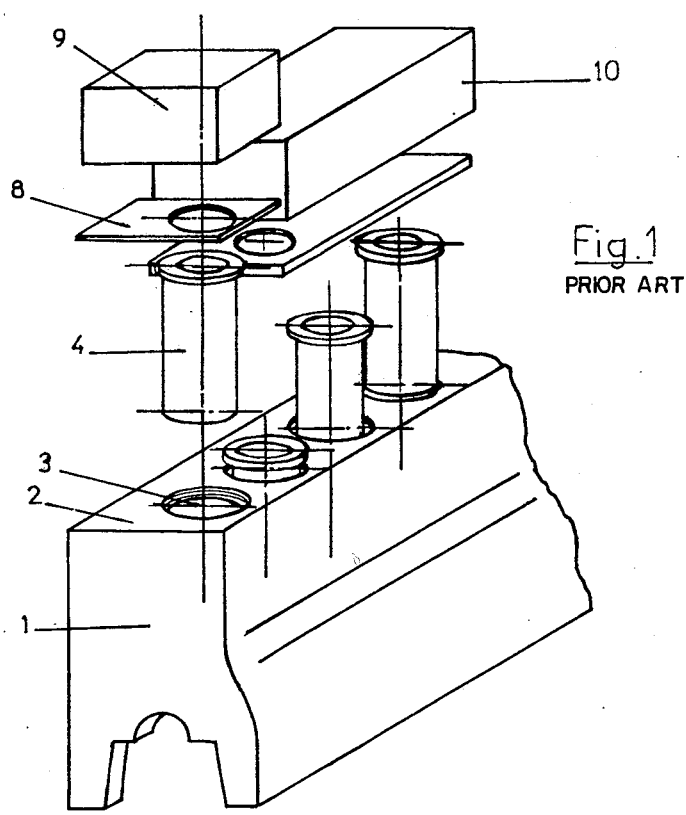
FIGS. 1 through 5 relate to the prior art which is described in detail hereinabove.
Figure 2:
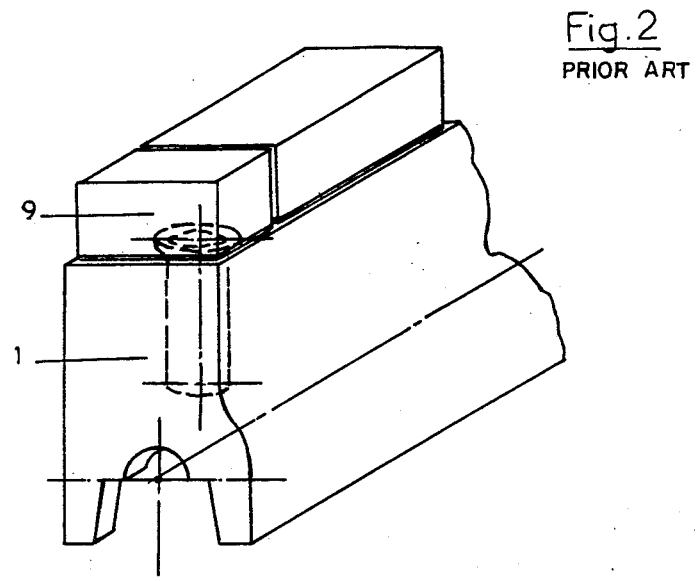
Figure 3:
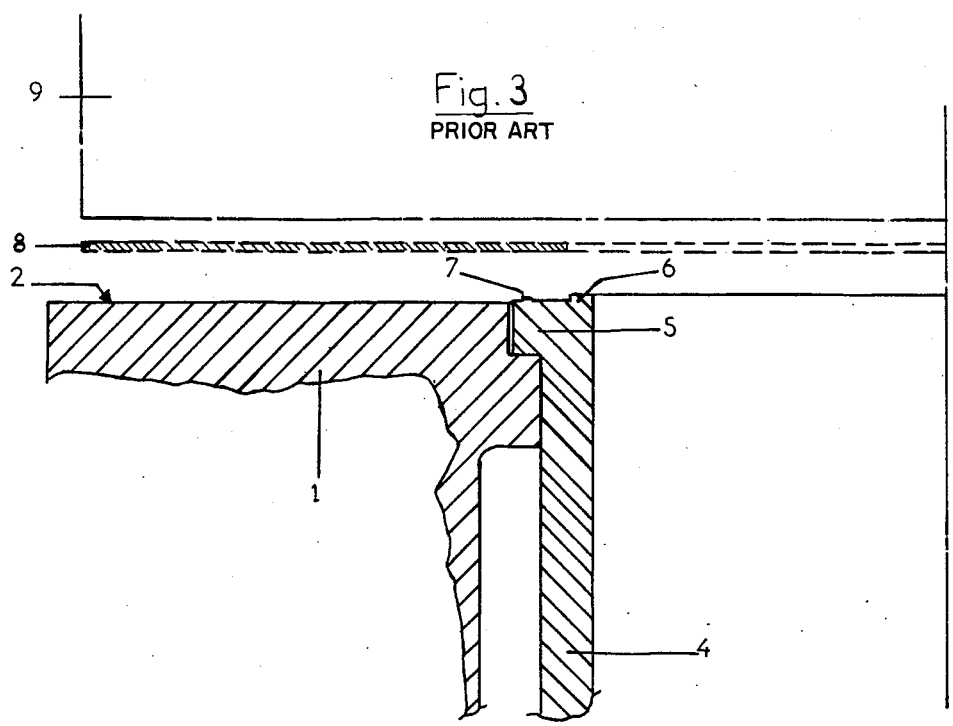
Figure 4:
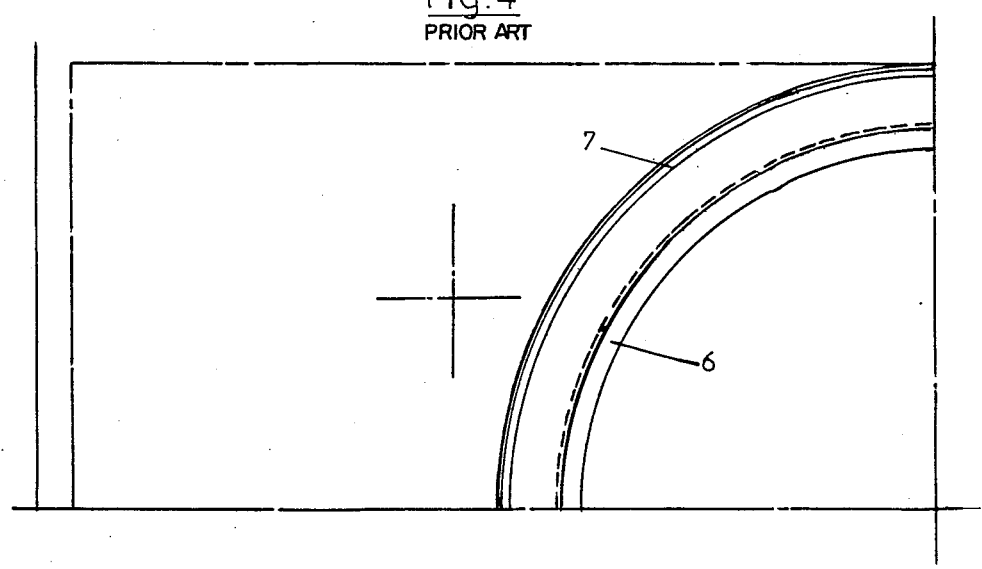
Figure 5:
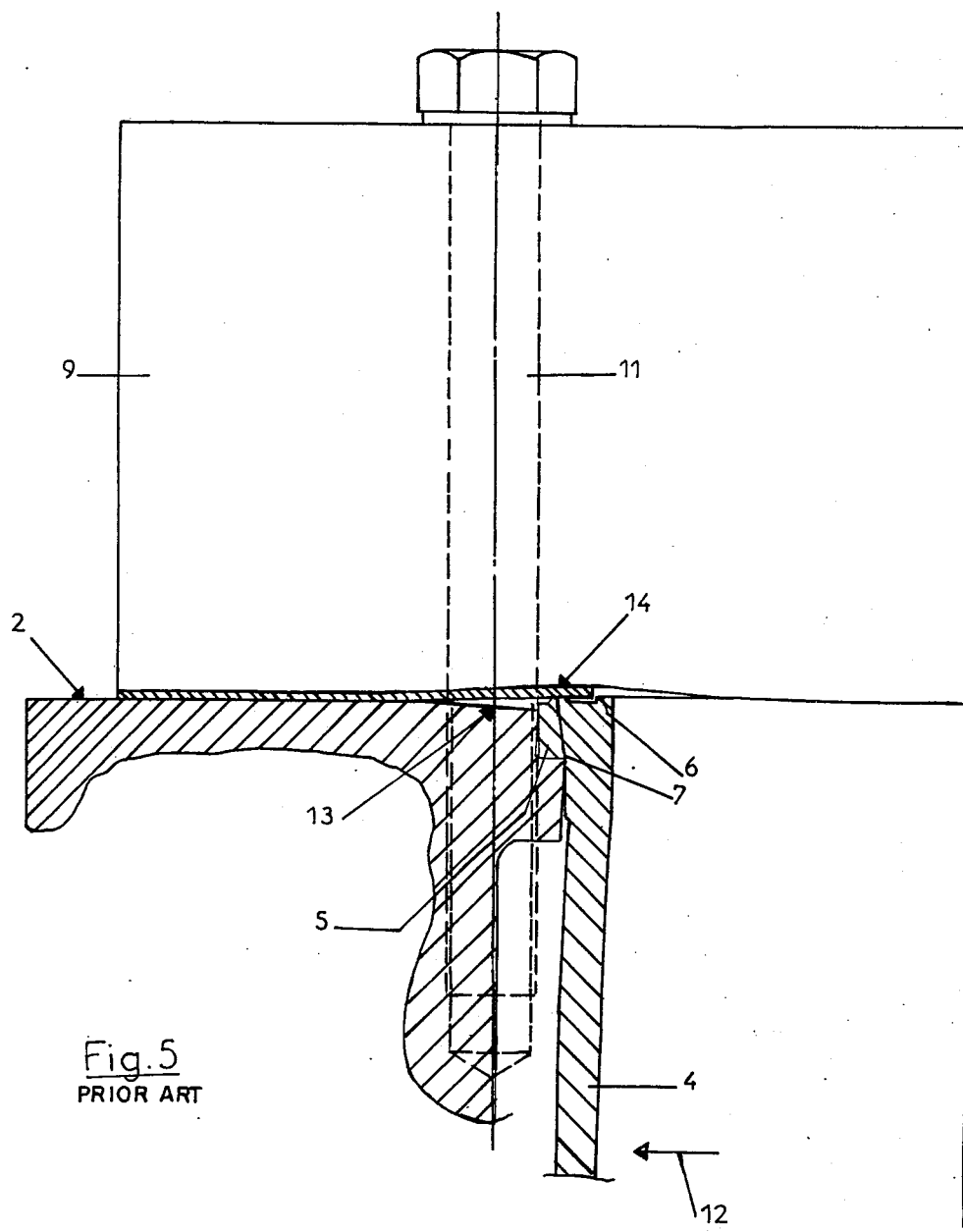
Figure 7:
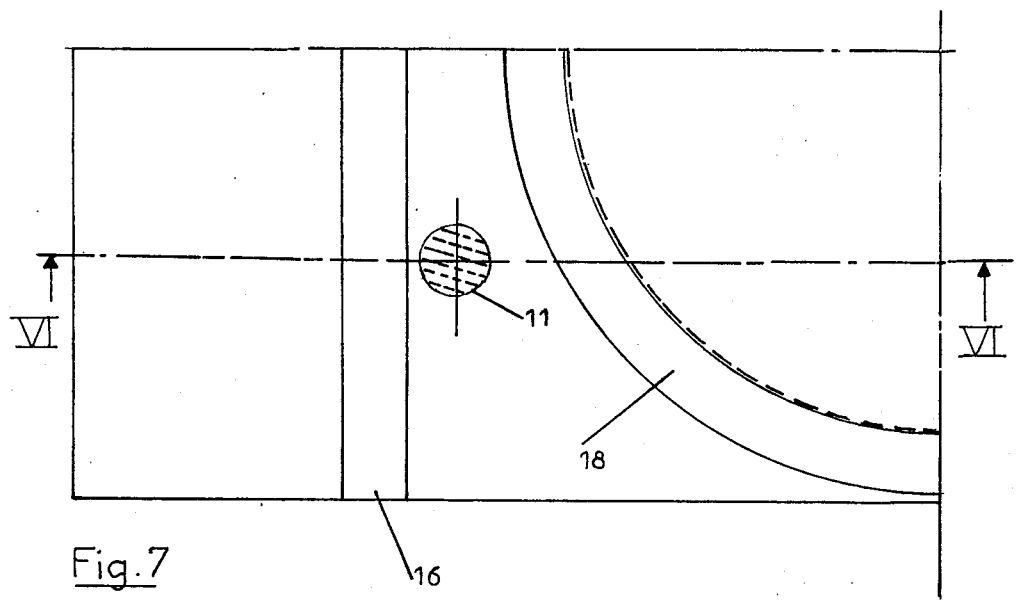
FIG. 7 is a diagrammatic section along line VII—VII of FIG. 6.
Figure 6:
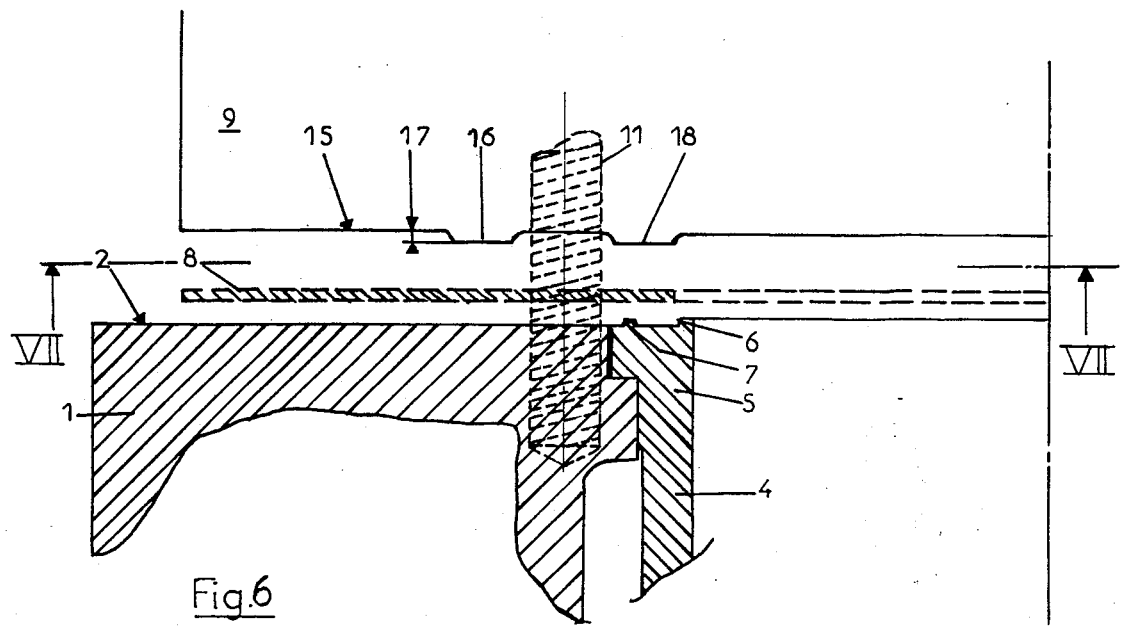
FIG. 6 is a sectional view, along line VI—VI of FIG. 7, showing a first possible embodiment of a tightness device according to the invention.

In the embodiment illustrated in FIGS. 6 and 7, the ribs 6 and 7 of the flange 5 of the liner 4 project above the top major surface, or the plane of the top part 2, of the cylinder block 1.

Tightening the cylinderhead 9 is ensured by screws such as 11. A cylinderhead gasket 8 is interposed between the cylinderhead 9 and the cylinder block 1.

In the embodiment shown in FIGS. 6 and 7, the gasket 8 is a flat gasket of a conventional type. The invention lies in the provision of a boss or raised portion 16 under the plane bearing surface or bottom major surface 15 of the cylinderhead 9, said portion 16 projecting by a thickness 17 substantially equal to the thickness of the ribs 6 and 7.

In the embodiment, another circular raised portion 18 projects outside the joining plane 15 of the cylinderhead 9, above the flange 5 of the liner 4.

Owing to this disposition, it will be seen that at the time the cylinderhead 9 is tightened each screw 11 is mounted like a compensator between the bearing portion 16, on the one hand, and the bearing parts 6, 7, 18 on the other hand. The locking of the screw 11 thus takes place in a well-balanced way, without bringing about any secondary deformation of the liner 4.

Figure 8:
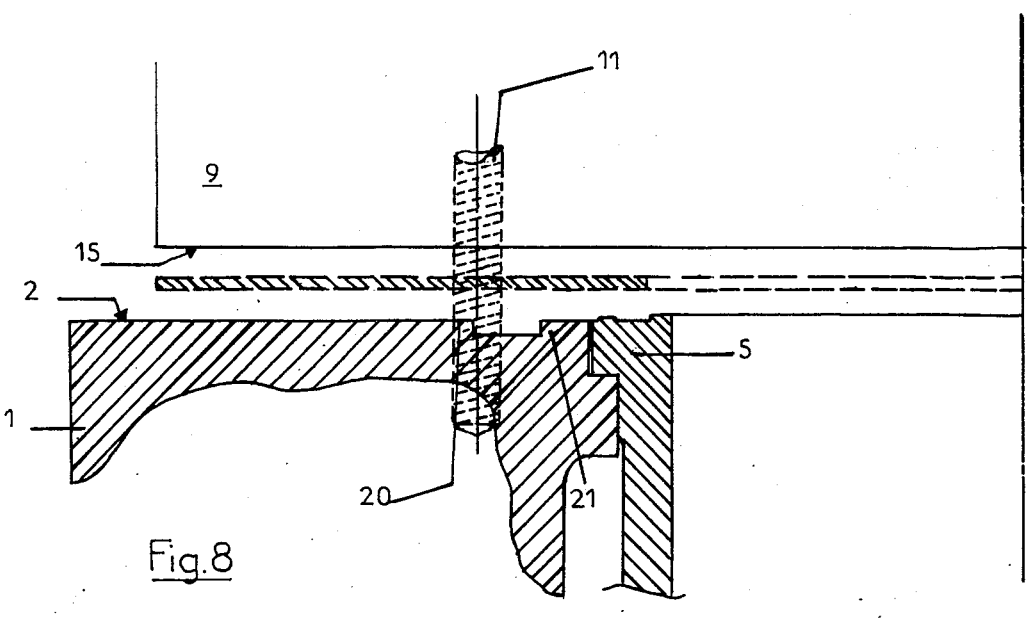
FIGS. 8 and 9 are similar views for a second embodiment.
Figure 9:
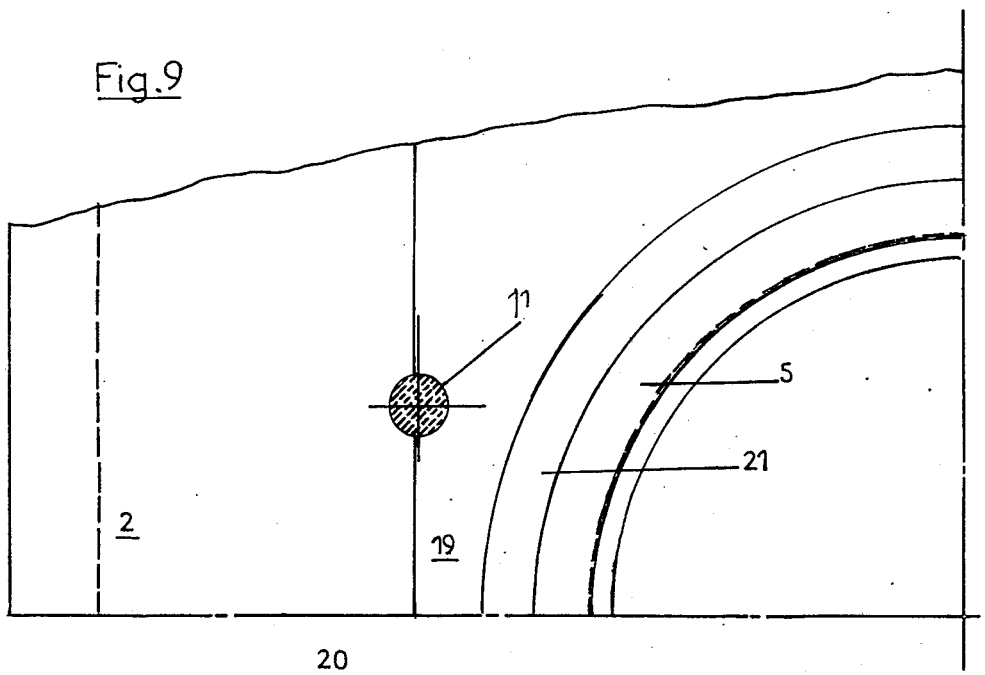

In the embodiment shown in FIGS. 8 and 9, the joining surface 15 of the cylinderhead 9 is completely flat. But a groove 19, through which the screw 11 passes, is recessed in the top part 2 of the cylinder block 11, so that said top part 2 is provided with:

a first raised bearing surface 20 on one side of the screw 11;

a second raised bearing surface 21 on the other side of the screw 11, in close vicinity to the flange 5 of the liner 4.

Hereagain, the screw 11 is mounted like a compensator between said two bearing surfaces 20, 21, so as to ensure a well-balanced tightening.

Figure 10:
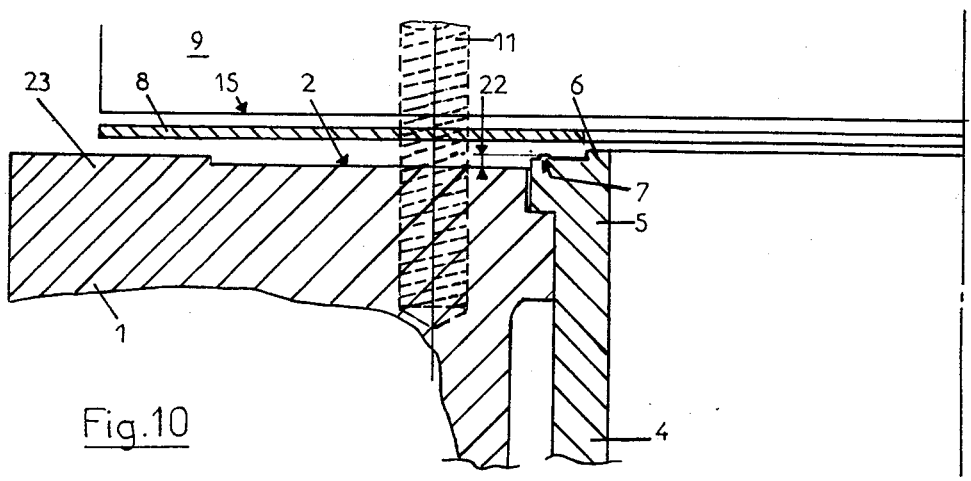
FIGS. 10 and 11 correspond to a third embodiment.
Figure 11:
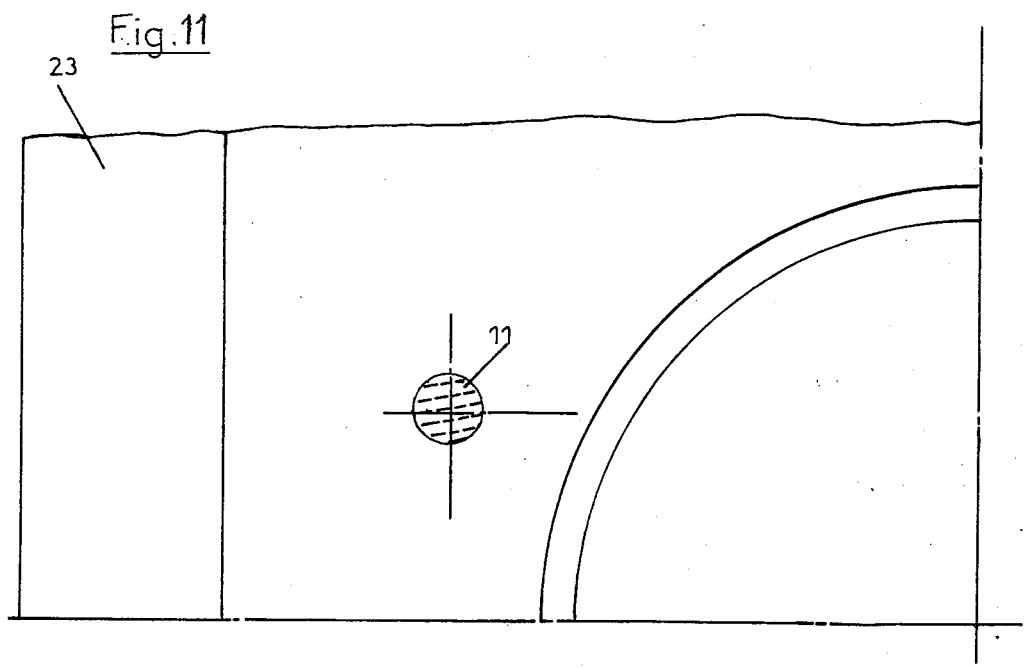

In the embodiment shown in FIGS. 10 and 11, the flange 5 and its ribs 6 and 7 project by a height 22 above the flat top 2 of the cylinder block 1. A boss 23 is provided opposite the screw 11, said boss projecting by substantially the same height 22 above the plane of the top 2.

On the other hand, the cylinderhead gasket 8 remains flat and has a constant thickness. The underface 15 of the cylinderhead 9 is likewise completely flat.

At the time of the tightening, each screw 11 is mounted like a compensator between the two bearings constituted by the boss 23, on the one hand, and the projecting portions of the flange 5 and the ribs 6 and 7, on the other hand.

Figure 13:
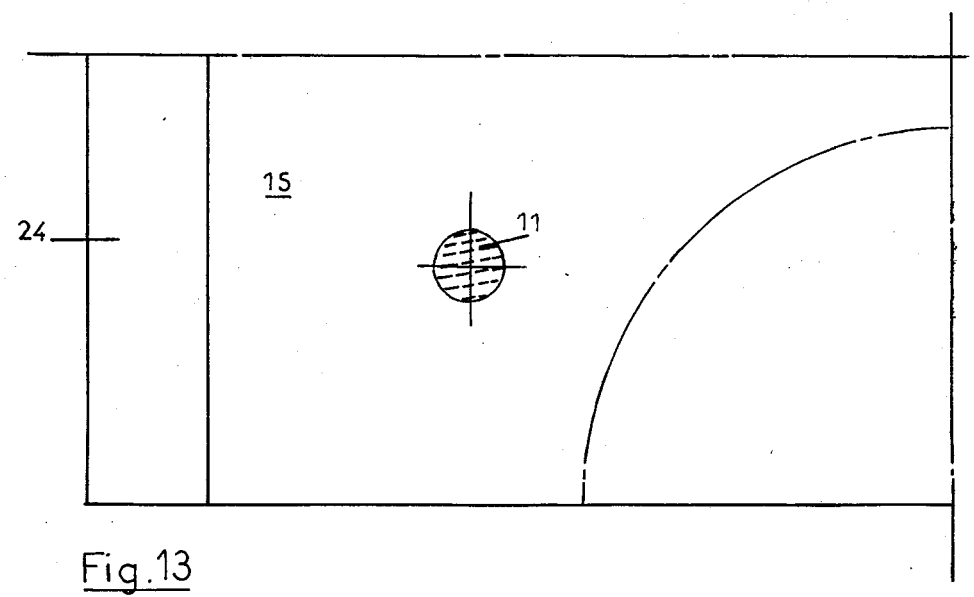
FIGS. 12 and 13 illustrate a fourth embodiment.
Figure 12:
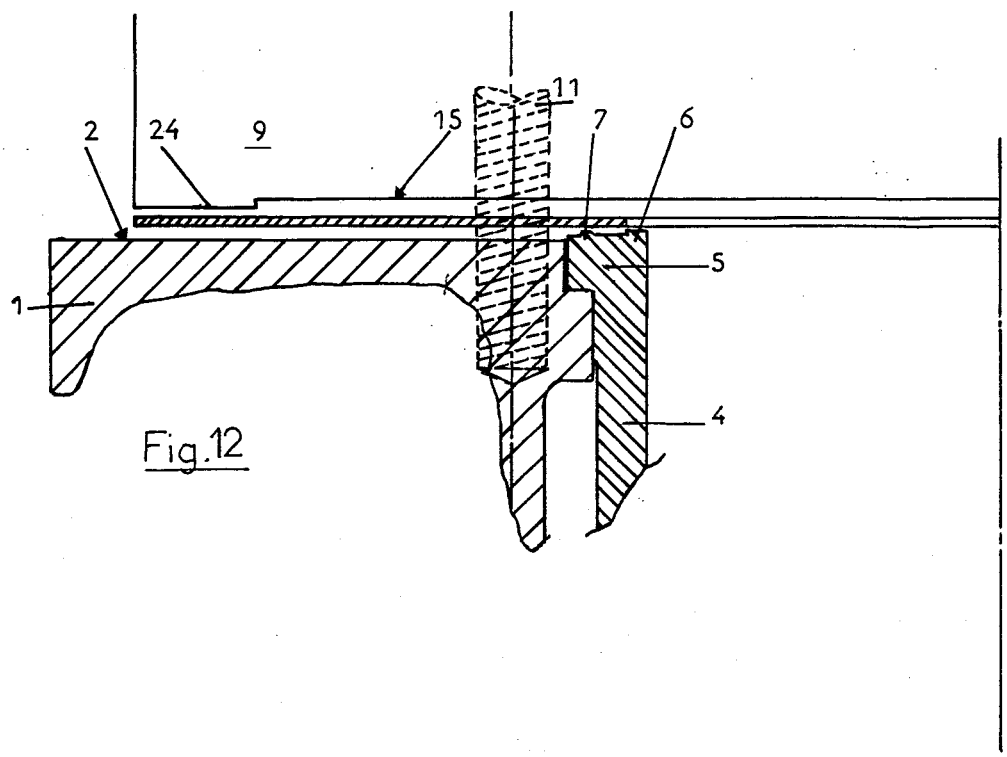

The embodiment shown in FIGS. 12 and 13 is the opposite of the previous one. In other words, the raised portion is constituted by a boss 24 projecting from the joining plane 15 of the cylinderhead 9, while the bearing top 2 of the cylinder block 1 is completely flat. On the other hand, the flange 5 of the liner 4 and the ribs 6 and 7 thereof project above the plane of the top 2.

Figure 14:
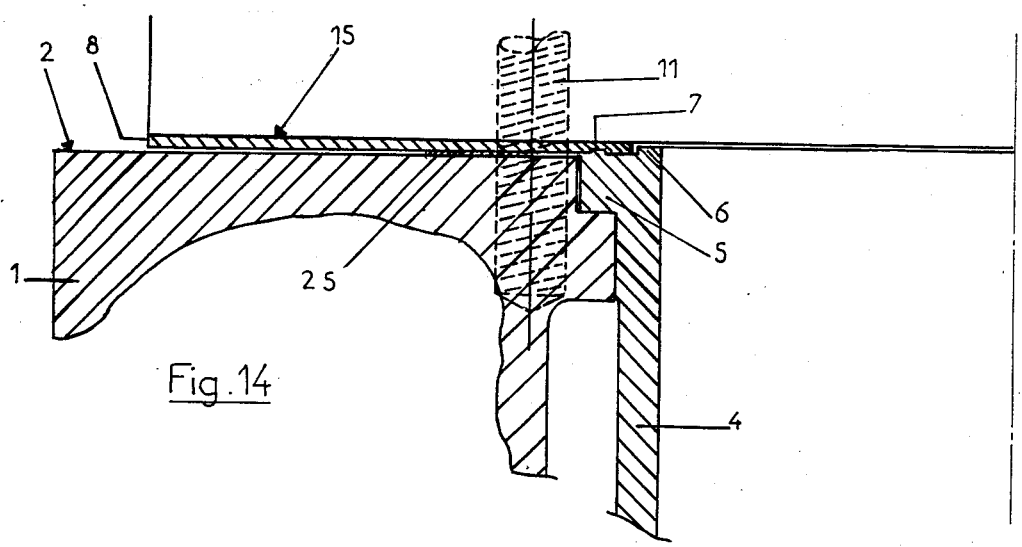
FIGS. 14 and 15 correspond to a fifth embodiment.
Figure 15:
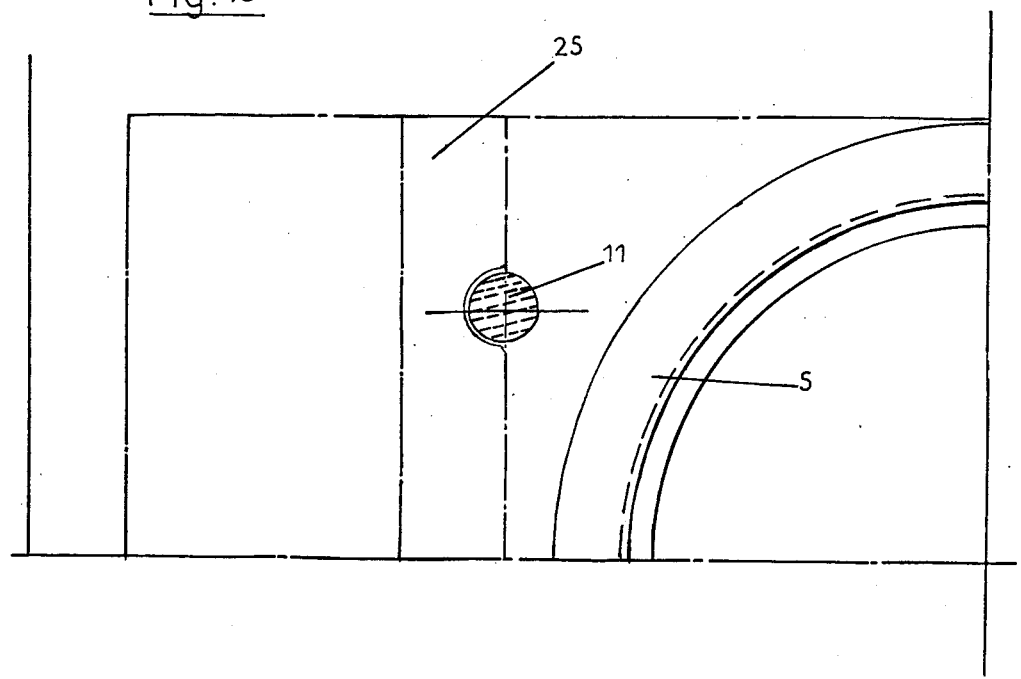

In the embodiment shown in FIGS. 14 and 15, the underface 15 of the cylinderhead 9 and the top 2 of the cylinder block 1 are completely flat, in the conventional way.

The flange 5 of the liner 4 and its ribs 6 and 7 project above the plane of the bearing top 2. Opposite these raised portions, that is, behind each screw 11, a flat strip 25 is disposed, which forms a thickness wedge. The thickness of said wedge 25 is substantially equal to the extent by which the elements 5, 6, 7 project above the plane of the bearing top 2. On the other hand, a flat gasket 8 of a known type and constant thickness is interposed between the cylinderhead 9 and the cylinder block 1.

Here, each screw 11 is mounted like a compensator between the two bearing bosses constituted, the one by the shim or wedge 25, and the other by the raised portions of the flange 5 of the liner 4.

Of course, the wedge 25 may conveniently be mounted:

either between the gasket 8 and the bearing top 2 of the cylinder block 1, or between the gasket 8 and the underface 15 of the cylinderhead 9.

Figure 16:
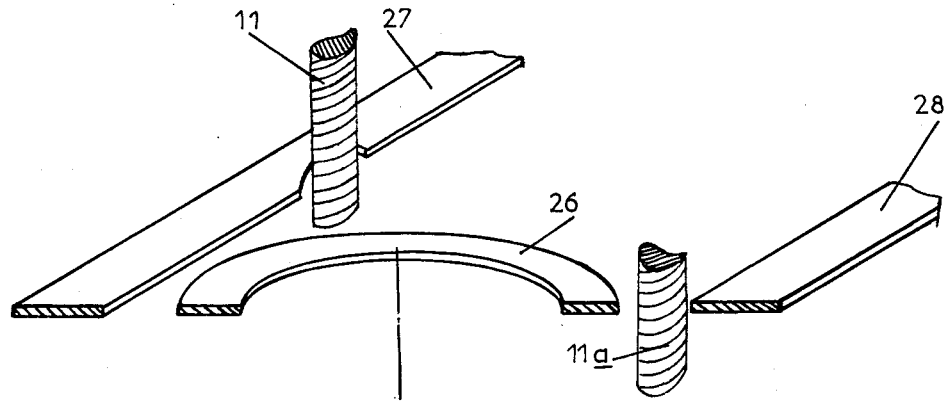
FIG. 16 is a perspective view illustrating the component parts of the gasket according to a sixth embodiment.

FIG. 16 illustrates a cylinderhead gasket intended to be used between a cylinderhead 9 and a cylinder block 1 that is completely flat, that is, of the kind shown in FIGS. 14 and 15. The gasket of FIG. 16 includes:

an annular flat gasket 26 intended to be laid on the top of the flange 5 of every liner 4;

a strip or shim 27, similar to the strip 25, and intended to be mounted behind a row of screws 11; and a further strip or shim 28, intended to be mounted parallel to the shim 27, but on the other side of another row of screws such as that which corresponds to the reference numeral 11a.

Hereagain, each of the screws in the row 11 is mounted like a compensator between the shim 27 and the flat annular gasket 26, while each screw in the row 11a is mounted like a compensator between said same flat annular gasket 26 and the strip or shim 28.

In the modified embodiment shown in FIGS. 17 and 18, a cylinderhead gasket 29 according to the invention is illustrated. The thickness of said gasket is constant at all points. On the other hand, said gasket is cut out in a manner such as to define a single unit equivalent to the individual elements 26, 27, 28 of FIG. 16.

In particular, the gasket 29 includes:

a flat annular control portion 30 equivalent to the gasket 26 of FIG. 16, a strip 31 provided with notches 32 which allow said strip to pass behind the screws in the row 11, in the same way as the strip 27 of FIG. 16, a further strip 33 provided with notches 34 which allow said strip to pass behind the screws in the row 11a in the same way as the shim 28 of FIG. 16, and, accessorily, flat elements intended to ensure the tightness around the push rods of the rockers as regards the area 35, and around the passage holes for water or oil as regards the areas such as 36, 37 and 38.

FIG. 19 shows a part of a multicylinder diesel engine, on which two cylinderheads 49 and 59 are juxtaposed. One or more screws 11 are mounted astride two adjacent cylinderheads 49 and 59. A flat gasket 39 is disposed on either side of each screw 11 so as to bear on the raised portions of two adjacent liners 44 and 54. Thus, each screw 11 is mounted in the manner of a compensator between the two support points defined by the raised portion of the flange of the liner 44, on the one hand, and the raised portion of the flange of the liner 54, on the other hand.

It will be seen that, in all the various embodiments described hereinabove, mounting the screws 11 or 11a between two support points ensures a well-balanced tightening, free from any secondary deformation at the level of the liners or the gasket planes.

I claim:

1. A device for securing together a cylinder block and a cylinderhead of an engine with an interposed gasket which bears on the raised top of at least one liner disposed in said cylinder block, comprising:

a plurality of screws disposed around said liner and oriented substantially parallel to the longitudinal axis of said liner;

the stem of each said screw passing through said cylinder head and gasket into said cylinder block intermediate to support portions of substantially equal thickness, said support portions being disposed between the top major surface of said cylinder block and the bottom major surface of said cylinderhead;

one of said support portions being defined by the raised portion at the top of said liner;

each said screw being mounted intermediate said support portions in the manner of a compensator to provide for balancing the stresses at the time of tightening said cylinderhead;

at least a first raised support portion, on one side of each said screw, located between the opposite planes of said cylinderhead and said cylinder block, the thickness of said first support portion being substantially equal to the thickness of a second raised support portion located on the other side of said screw and comprising the projecting portion of said top of the corresponding cylindrical liner;

a cylinderhead gasket the thickness of which is substantially constant, and a first support portion defined by a raised strip projecting from the underface of the cylinderhead; and the underface of the cylinderhead including another raised portion having a substantially circular shape, which projects outside the plane of assembly of the cylinderhead above the flange of the liner.

* * * * *